US 6,415,668 B1

(12) United States Patent
Cage (10) Patent No.: US 6,415,668 B1
(45) Date of Patent: Jul. 9, 2002

(54) DE-COUPLING EXTRANEOUS MODES OF VIBRATION IN A CORIOLIS MASS FLOWMETER

(75) Inventor: Donald R. Cage, Longmont, CO (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/911,000

(22) Filed: Jul. 23, 2001

(51) Int. Cl.[7] .................................................. G01F 1/84
(52) U.S. Cl. ................................................. 73/861.355
(58) Field of Search ...................... 73/861.355, 861.356, 73/861.357

(56) References Cited

U.S. PATENT DOCUMENTS

| | | | | |
|---|---|---|---|---|
| 4,781,069 A | * | 11/1988 | Mitzner | 73/861.355 |
| 5,054,326 A | * | 10/1991 | Mattar | 73/861.355 |
| 5,370,002 A | | 12/1994 | Normen et al. | |
| 5,497,666 A | * | 3/1996 | Patten et al. | 73/861.355 |

\* cited by examiner

*Primary Examiner*—Harshad Patel
(74) *Attorney, Agent, or Firm*—Henry C. Query, Jr.

(57) ABSTRACT

The present invention is directed to a Coriolis mass flowmeter having first and second generally parallel flowtubes which each extend between an inlet manifold and an outlet manifold and comprise respective first and second centerlines that lie in corresponding parallel first and second planes, at least one force driver for vibrating the first and second flowtubes in a natural mode of vibration and at least one motion sensor for detecting the vibrating motion of the flowtubes. In particular, the invention comprises at least one brace bar for decoupling extraneous modes of vibration in the flowtubes from the desired driven and Coriolis modes of vibration. The brace bar includes a first stiffening member having a first opening through which the first flowtube is received and secured; a second stiffening member having a second opening though which the second flowtube is received and secured; and at least one bridge component which is connected to the first stiffening member proximate the first plane and the second stiffening member proximate the second plane.

6 Claims, 6 Drawing Sheets

DE-COUPLING EXTRANEOUS MODES OF VIBRATION IN A CORIOLIS MASS FLOWMETER

BACKGROUND OF THE INVENTION

The present invention relates to a Coriolis-type mass flowmeter. More particularly, the invention relates to such a flowmeter which comprises dual parallel flowtubes and at least one brace bar connected between the flowtubes for decoupling extraneous modes of vibration from the desired the driven and Coriolis modes of vibration.

Coriolis mass flowmeters typically comprise at least one flowtube which is connected to a section of process piping that contains a fluid to be measured, one or more force drivers for vibrating the flowtube in one of its natural modes of vibration, such as its first bending mode of vibration, and a number of motion sensors for detecting the vibrating motion of the flowtube. As the fluid flows through the vibrating flowtube it generates Coriolis forces that cause the flowtube to deform into a unique and characteristic shape, which is commonly referred to as the "Coriolis deflection". Thus, in operation the flowtube is subjected to a "driven" mode of vibration, which is generated by the force drivers, and a "Coriolis" mode of vibration, which is generated by the Coriolis forces. As is well understood by those of ordinary skill in the art, the mass flow rate and certain other properties of the fluid can be determined from the Coriolis deflection of the flowtube, which is measured by the motion sensors.

In the field of mass flow measurement, dual tube Coriolis mass flowmeters are often preferred for their accuracy and dependability. These flowmeters typically comprise two identical parallel flowtubes, an inlet manifold which is connected between the process piping and a first end of each flowtube, and an outlet manifold which is connected between the process piping and a second end of each flowtube. The flowtubes can have various configurations, including S-shaped and U-shaped, and each flowtube lies in a plane that is parallel to the plane of the other flowtube when the flowmeter is assembled. Furthermore, the force drivers are mounted so as to vibrate the flowtubes toward and away from each other in the Z direction, which is defined herein as being perpendicular to the planes of both flowtubes. Consequently, the flowtubes vibrate 180 degrees out of phase with each other in both the driven and Coriolis modes of vibration.

In addition to the desired driven and Coriolis modes of vibration, the flowtubes can be subjected to extraneous modes of vibration which are caused by, for example, pumps or other auxiliary equipment that are connected to the process piping. These extraneous modes of vibration, which can cause the flowtubes to vibrate either in-phase or out-of-phase with each other, can couple to the driven and Coriolis modes of vibration and thereby cause flow measurement errors. As used herein, the term "couple" as between two modes of vibration means that the energy from one mode of vibration is linked to the second mode of vibration in such a way as to cause the excitation and response of that second mode of vibration. Therefore, it is desirable to prevent any energy exchange between the extraneous modes of vibration and the driven and Coriolis modes of vibration in order to minimize the potential flow measurement errors.

Brace bars have been employed in prior art dual tube Coriolis mass flowmeters to decouple certain extraneous modes of vibration from the desired driven and Coriolis modes of vibration. As described for example in U.S. Pat. No. 5,370,002, a brace bar is typically a flat plate having two holes through which the flowtubes are passed and secured. Two separate brace bars are usually connected to the flowtubes at spaced-apart locations, and the force drivers and motion sensors are positioned between the brace bars. Consequently, the pivot points for the driven and Coriolis vibrations are shifted to the brace bars, while the pivot points for certain of the extraneous vibrations remain at the inlet and outlet manifolds. Thus, the brace bars separate the frequency of these extraneous modes of vibration from the frequency of the driven and Coriolis modes of vibration and thereby decouple the extraneous modes from the driven and Coriolis modes.

However, certain lateral modes of vibration, that is, extraneous modes of vibration which are parallel to the planes of the flowtubes, can cause the normally round cross section of each flowtube to deform elliptically where the flowtube passes through the brace bar. Moreover, this elliptical deformation may cause traditional brace bars to stretch and compress during the vibration cycle of the lateral mode, which in turn can push and pull the centerlines of the flowtubes toward and away from each other. As a result, the flowtubes are caused to vibrate out-of-phase with each other in the Z-direction. Furthermore, since these extraneous vibrations emanate from brace bars, they can directly couple to the driven and Coriolis modes of vibration and result in flow measurement errors.

SUMMARY OF THE INVENTION

In accordance with the present invention, these and other limitations in the prior art are overcome by providing a brace bar for a Coriolis mass flowmeter having first and second generally parallel flowtubes which each extend between an inlet manifold and an outlet manifold and comprise respective first and second centerlines that lie in corresponding parallel first and second planes, at least one force driver for vibrating the first and second flowtubes in a natural mode of vibration and at least one motion sensor for detecting the vibrating motion of the flowtubes, the brace bar comprising a first stiffening member having a first opening through which the first flowtube is received and secured, a second stiffening member having a second opening though which the second flowtube is received and secured, and at least one bridge component which is connected to the first stiffening member proximate the first plane and the second stiffening member proximate the second plane.

In this manner, the first and second stiffening members will restrict the degree to which the first and second flowtubes can deform elliptically when subjected to lateral modes of vibration. In addition, the stiffening members are preferably connected only through the bridge component so that any elliptical deformation of the stiffening members, which may be caused by the elliptical deformation of the flowtubes, will not result in movement of the flowtubes in the Z-direction. Furthermore, since the bridge component is connected to the stiffening members only through the first and second planes of the flowtubes, the elliptical deformation of the flowtubes will not cause the bridge component to deform and displace the flowtubes in the Z-direction. Therefore, the brace bar of the present invention effectively decouples the lateral modes of vibration from the driven and Coriolis modes of vibration.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
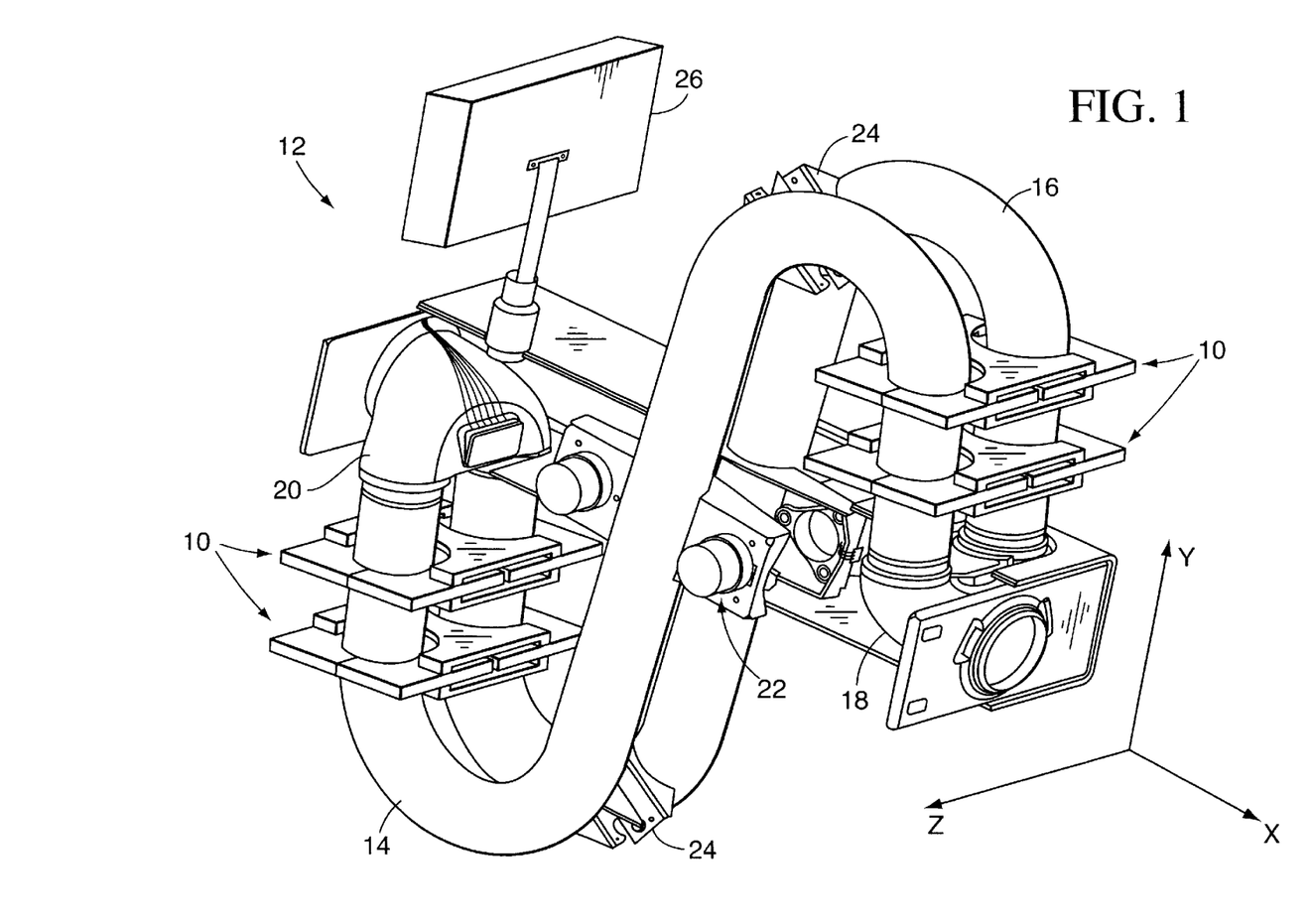
FIG. 1 is a perspective view of an exemplary dual tube Coriolis mass flowmeter having a number of brace bars of the present invention installed thereon.

Referring to FIG. 1, a number of brace bars of the present invention, which are indicated generally by reference number 10, are shown installed on an exemplary dual tube Coriolis mass flowmeter 12. For purposes of this description, the rectangular coordinate system having the X, Y and Z axes oriented as shown may be used to describe the relationships between the various components of the flowmeter 12. The flowmeter 12 includes two flowtubes 14 and 16 which each extend between an inlet manifold 18 and an outlet manifold 20. The inlet and outlet manifolds 18, 20 are connected to respective sections of process piping (not shown), such as a pipeline. Each flowtube 14, 16 comprises an S-shaped configuration and an axial centerline $CL_{14}$, $CL_{16}$ which lies in a respective X-Y plane of the flowmeter 12. Accordingly, the flowtubes 14, 16 are generally parallel to each other. The flowmeter 12 also includes a force driver 22 for vibrating the flowtubes in one of their natural modes of vibration, such as the first bending mode of vibration, and two motion sensors 24 for detecting the vibrating motion of the flowtubes. In the exemplary flowmeter 12 depicted in FIG. 1, the force driver 22 comprises an assembly of two conventional magnet/coil pairs and each motion sensor 24 comprises a similar magnet/coil pair.

In operation, fluid entering the inlet manifold 18 is split into two substantially equal streams and directed into the flowtubes 14, 16. The force driver 22 causes the flowtubes 14, 16 to deflect toward and away from each other in a predetermined driven mode of vibration. However, as the fluid flows through the vibrating flowtubes it generates Coriolis forces that cause the flowtubes to deflect in a Coriolis mode of vibration. Both the driven deflections and the Coriolis deflections are in the Z-direction, which is perpendicular to the X-Y planes of the flowtubes 14, 16. The motion sensors 24 generate signals indicative of the Coriolis vibrations of the flowtubes and transmit these signals to a suitable processing and control circuit 26, which then uses the signals to calculate the mass flow rate of the fluid in a manner that is well understood by those of ordinary skill in the art.

In accordance with the present invention, the exemplary dual tube Coriolis mass flowmeter 12 is equipped with preferably four brace bars 10: two near the inlet manifold 18 and two near the outlet manifold 20. As shown in FIG. 1, each brace bar is optimally mounted to the flowtubes 14, 16 in an X-Z plane of the flowmeter 12. The brace bars 10 function to decouple the extraneous modes of vibration acting on the flowtubes 14, 16 from the desired driven and Coriolis modes of vibration. Of course, any number of brace bars 10 may be used for this purpose; but a minimum of one brace bar is preferably mounted near each of the inlet and outlet manifolds 18, 20 to ensure that the driven and Coriolis modes of vibration are adequately isolated from the extraneous modes of vibration.

In addition to the extraneous modes of vibration which act in the Y-Z plane of the flowmeter 12, the brace bar 10 is particularly effective in decoupling lateral modes of vibration, that is, extraneous modes of vibration which act in the X-Y plane of the flowmeter. These lateral modes of vibration occur naturally depending on the particular flowtube shape and are easily excited by pumps or other auxiliary equipment which are connected to the process piping. Furthermore, these lateral vibrations can cause the normally round cross section of each flowtubes 14, 16 to deform into an elliptical shape. This elliptical deformation of the flowtubes is most prevalent adjacent the brace bars 10 and in the bends in the flowtubes. Moreover, with prior art brace bars, the elliptical deformation of the flowtubes can cause the axial centerlines of the flowtubes to deflect toward and away from each other in the Z direction, thus creating an extraneous mode of vibration that can couple to the driven and Coriolis modes of vibration and lead to flow measurement errors.

Figure 2A:
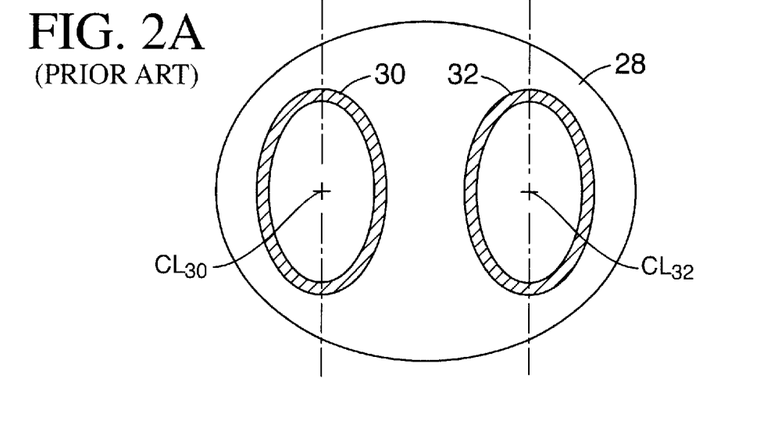
FIGS. 2A–2C are representations of the affect that certain extraneous modes of vibration can have on a prior art brace bar.
Figure 2B:
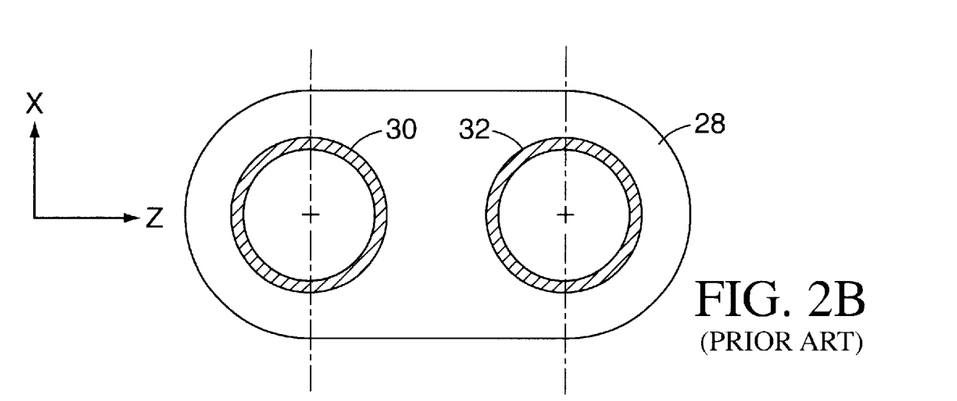
Figure 2C:
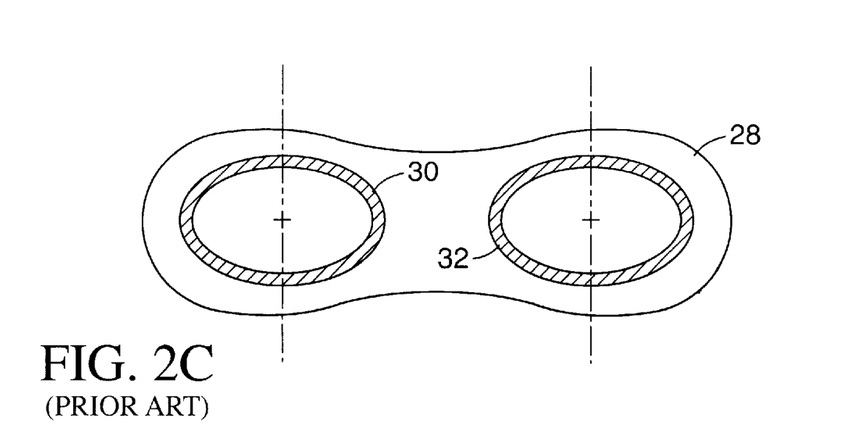

This elliptical deformation affect can best be understood by reference to FIGS. 2A–2C, which depict a prior art brace bar 28 having two holes through which the flowtubes 30 and 32 of an exemplary dual tube Coriolis mass flowmeter are inserted and secured. When the flowtubes 30, 32 are subjected to lateral modes of vibration, the normally circular cross section of each flowtube will deform elliptically, and the orientation of this elliptical deformation will change during the cycle of each lateral vibration. Thus, during each cycle of the lateral vibration the cross section of each flowtube 30, 32 will form an ellipse having its major axis aligned with the X axis (FIG. 2A), pass through the undeformed circular shape (FIG. 2B), and then form an ellipse having its major axis aligned with the Z axis (FIG. 2C). The elliptical deformation of the flowtubes 30, 32 will cause the adjacent portions of the brace bar 28 to similarly deform, which in turn will cause the brace bar to stretch and compress to accommodate this deformation. As the brace bar stretches and compresses it will push and pull the centerlines $CL_{30}$, $CL_{32}$ of the respective flowtubes 30, 32 toward and away from each other in the Z-direction. Thus, the prior art brace bar 28 will convert the lateral vibrations into extraneous vibrations acting in the Z-direction, and these extraneous vibrations will couple to the driven and Coriolis modes of vibration and potentially lead to flow measurement errors.

Figure 3:
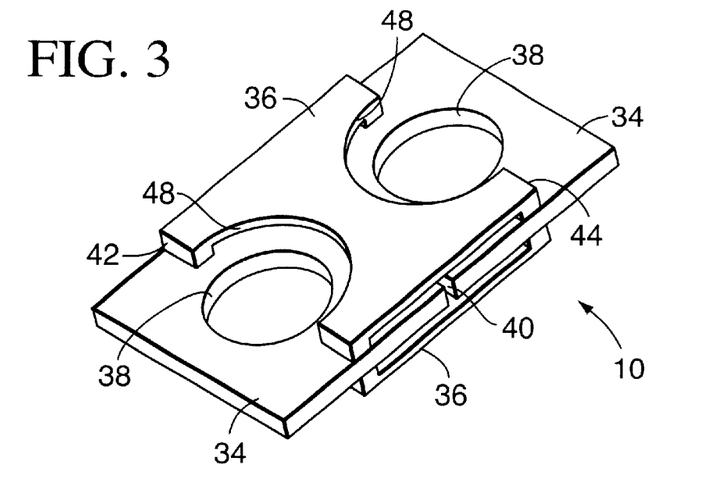
FIGS. 3–5 are perspective, front elevation and top plan views, respectively, of the brace bar depicted in FIG. 1.
Figure 4:
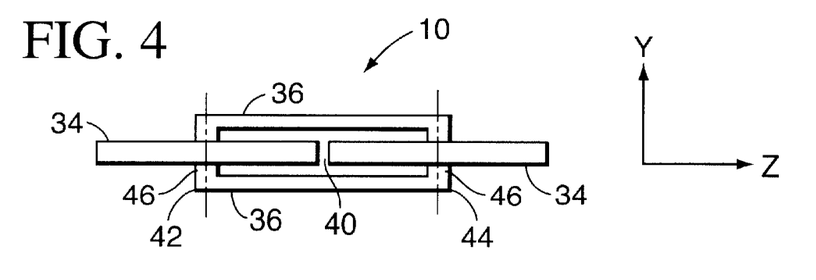
Figure 5:
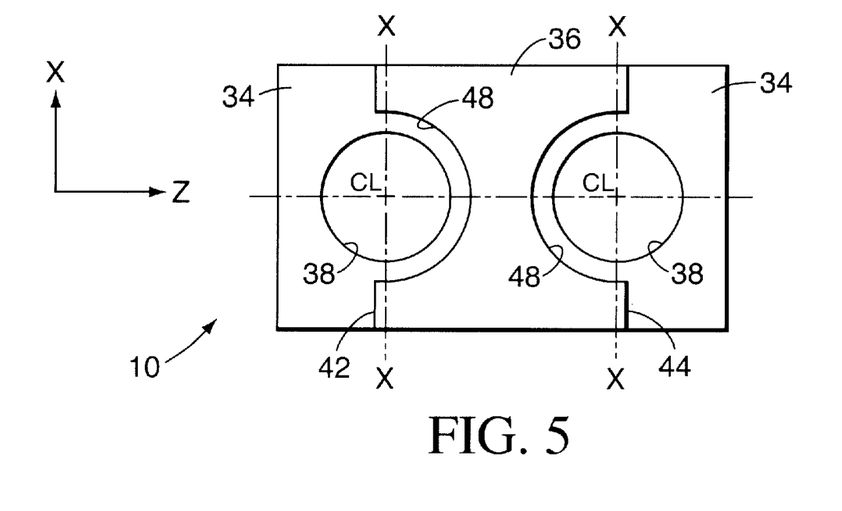

The brace bar 10 of the present invention is designed to prevent any lateral modes of vibration from inducing extraneous vibrations between the flowtubes in the Z-direction. Referring to FIGS. 3–5, each brace bar 10 preferably includes two separate stiffening members 34 which are joined by ideally two bridge components 36. Each stiffening member 34 includes a hole 38 which has a diameter approximately equal to the outer diameter of the flowtubes 14,16. Each hole 38 comprises an axial centerline CL and a central axis X-X which passes through the centerline and lies in the X-Y plane of the flowmeter 12 when the brace bar 10 is installed on the flowtubes. After each brace bar 10 is assembled, the flowtubes 14,16 of the flowmeter 12 are inserted into the holes 38 and secured to the stiffening members 34. Each stiffening member 34 is preferably made of a rigid material, for example stainless steel, which can be readily affixed to the flowtubes, such as by welding or brazing.

The stiffening members 34 add radial stiffness around the circumference of the flowtubes 14,16 in order to reduce the magnitude of the elliptical deformation of the flowtubes in the presence of lateral modes of vibration. Thus, the stiffening members 34 are preferably substantially wider than the outer diameter of the flowtubes 14, 16. However, the stiffening members 34 are not connected to and ideally do not touch each other at the mid-plane of the flowtubes 14,16, that is, the X-Y plane located midway between the planes of the flowtubes. Consequently, when the brace bar 10 is assembled a gap 40 preferably exists between the stiffening members 34. In addition, each stiffening member is ideally symmetrical about its central axis X-X to better constrain the cross section of the flowtubes 14,16 in the Z-direction. Furthermore, although the stiffening members 34 are depicted as having a generally square configuration, they could have practically any shape, including rectangular, polygonal or cylindrical.

Each bridge component 36 includes a first edge 42, a second edge 44 which is generally parallel to the first edge, and a lip 46 which extends transversely from each edge. In addition, each bridge component 36 is secured to the stiffening members 34 ideally by brazing or welding. Furthermore, the bridge components 26 are sized and configured such that, when the brace bar 10 is assembled, the lip 46 of each edge 42, 44 will be aligned with the central axis X-X of a corresponding stiffening member 34. Thus, once the brace bar 10 is attached to the flowtubes 14, 16, the bridge component 36 will effectively be joined to the stiffening members 34 only at the X-Y planes which pass through the centerlines $CL_{14}$, $CL_{16}$ of the flowtubes. Moreover, as shown in FIGS. 3 and 5, the first and second edges 42, 44 may each be provided with a semi-circular recess 48 to ensure that the bridge component 36 does not contact the flowtubes.

Figure 6A:
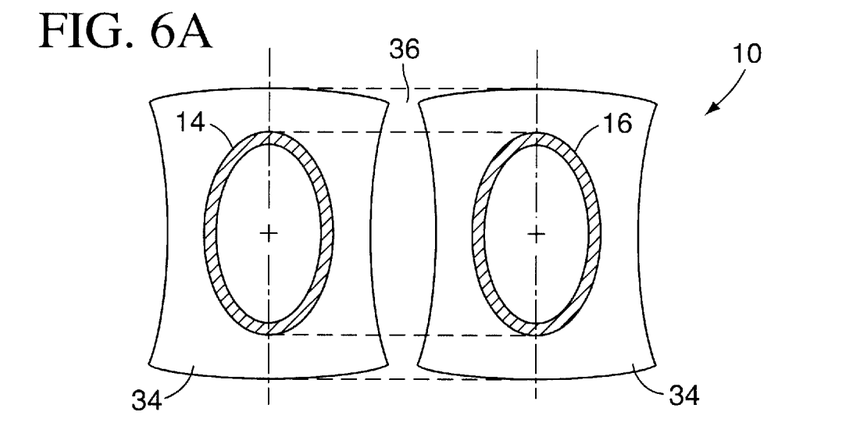
FIGS. 6A–6C are representations of the affect that certain extraneous modes of vibration can have on the brace bar depicted in FIGS. 3–5.
Figure 6B:
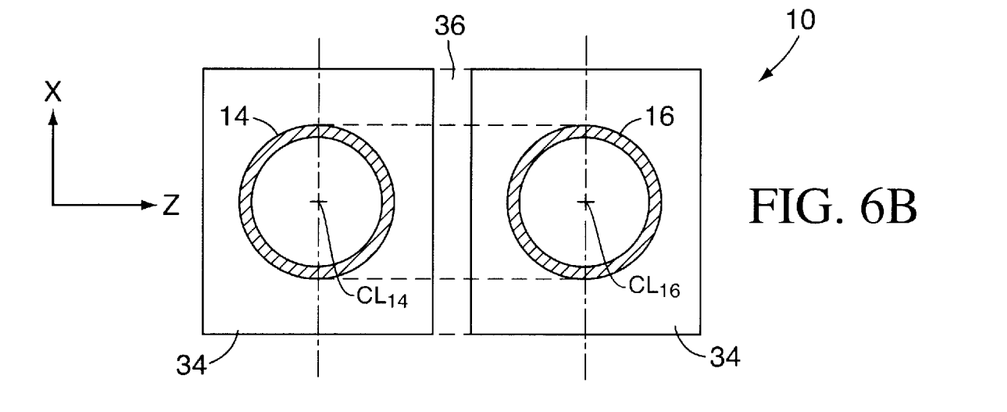
Figure 6C:
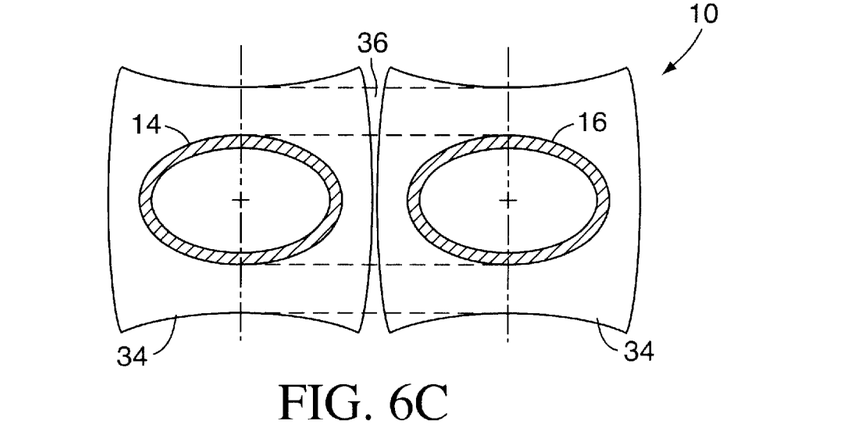

FIGS. 6A–6C illustrate the affect that the brace bar 10 has on preventing the lateral modes of vibration from generating extraneous vibrations between the flowtubes 14,16 in the Z-direction. In these Figures, the bridge component 36 is depicted in phantom as two separate rectangular members for purposes of simplicity. As was explained above, when the flowtubes 14, 16 are subjected to the lateral modes of vibration, the normally circular cross section of each flowtube will deform elliptically in a portion of the flowtube within and adjacent the brace bar 10. Thus, during each cycle of the lateral vibration the cross section of each flowtube 14, 16 will form an ellipse having its major axis aligned with the X axis (FIG. 6A), pass through the undeformed circular shape (FIG. 6B), and then form an ellipse having its major axis aligned with the Z axis (FIG. 6C). In addition, this elliptical deformation will cause the adjacent portions of the stiffening members 34 to similarly deform. However, since the stiffening members 34 are not connected to each other at the mid-plane of the flowtubes, the deformation of the stiffening members will not push and pull the centerlines $CL_{14}$ and $CL_{16}$ of the flowtubes toward and away from each other in the Z-direction. In addition, since the bridge components 36 are connected to the stiffening blocks 34 only through the central axes X-X, the bridge components will not deflect the centerlines $CL_{14}$, $CL_{16}$ in the Z-direction as the stiffening blocks deform elliptically. Thus, the brace bar 10 will not convert the lateral vibrations into extraneous vibrations between the flowtubes in the Z-direction. Therefore, the brace bar 10 effectively decouples the lateral modes of vibration from the driven and Coriolis modes of vibration.

Figure 7:
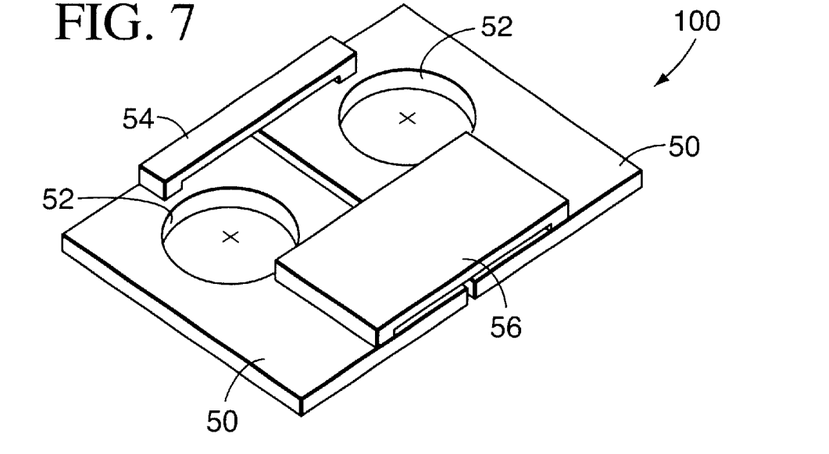
FIGS. 7–9 are perspective, front elevation and top plan views, respectively, of another embodiment of a brace bar of the present invention.
Figure 8:
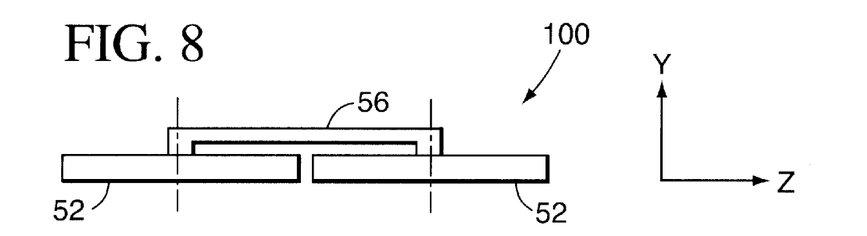
Figure 9:
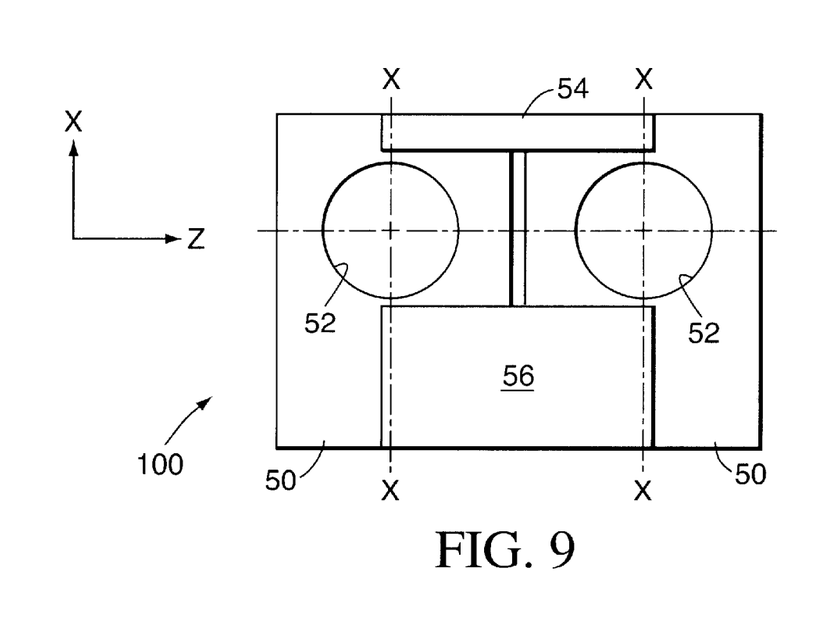

Another embodiment of the brace bar of the present invention is illustrated in FIGS. 7–9. The brace bar of this embodiment, which is indicated generally by reference number 100, is shown to be similar in many respects to the brace bar 10 described above. However, brace bar 100 comprises two stiffening members 50 which each comprise a rectangular shape and a hole 52 that is offset along the central axis X-X from the geometric center of the shape. In addition, the brace bar 100 includes preferably two distinct bridge components 54, 56 which are connected to the stiffening members 50 on opposite sides of the holes 52. As is evident from FIG. 9, the bridge component 56 is wider in the X-direction than the bridge component 54. This configuration of the brace bar 100 may be suitable to flowmeter designs in which the lateral modes of vibration generate greater forces through the bridge component 56 than through the bridge component 54.

Figure 10:
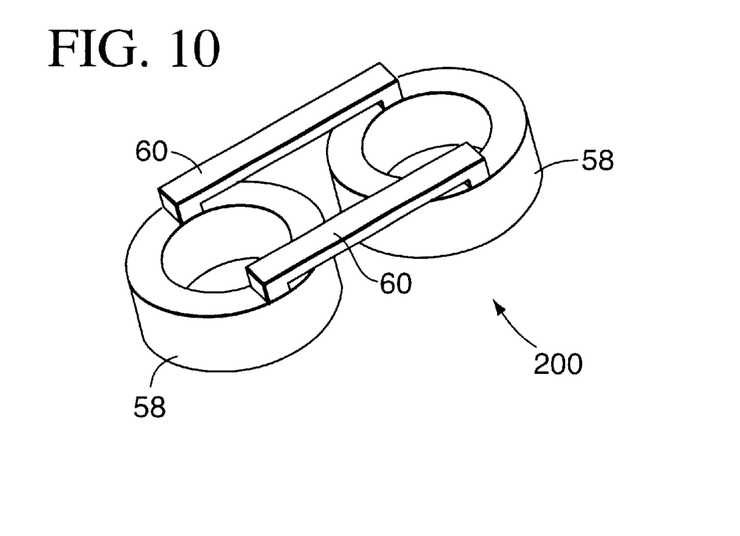
FIGS. 10–12 are perspective, front elevation and top plan views, respectively, of yet another embodiment of a brace bar of the present invention.
Figure 11:
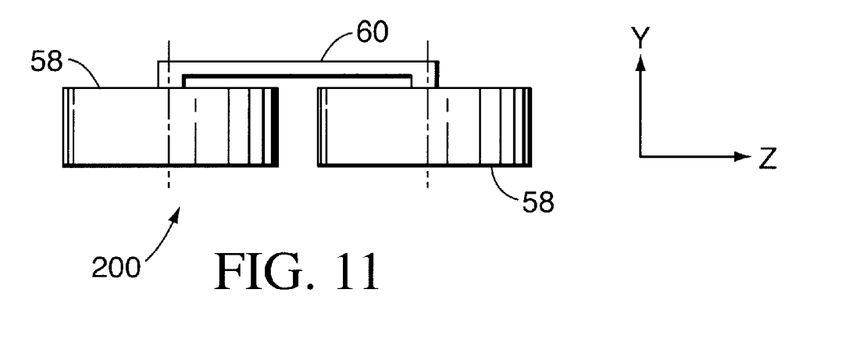
Figure 12:
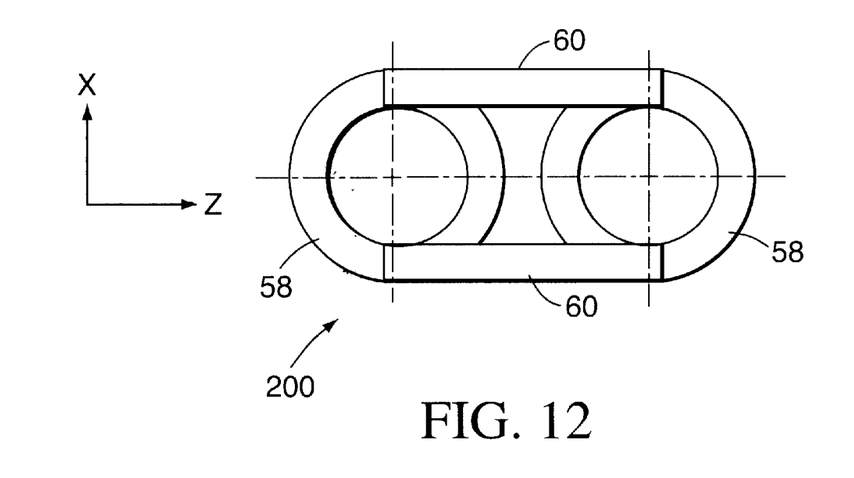

Yet another embodiment of a brace bar of the present invention is shown in FIGS. 10–12. The brace bar of this embodiment, which is indicated generally by reference number 200, is shown to comprise two generally cylindrical stiffening members 58 which are connected by two substantially similar bridge components 60. The brace bar 200 thus comprises only two pairs of components and is therefore relatively simple to manufacture.

It should be recognized that, while the present invention has been described in relation to the preferred embodiments thereof, those skilled in the art may develop a wide variation of structural and operational details without departing from the principles of the invention. For example, the various elements illustrated in the different embodiments may be combined in a manner not illustrated above. Therefore, the appended claims are to be construed to cover all equivalents falling within the true scope and spirit of the invention.

What is claimed is:

1. In combination with a Coriolis mass flowmeter having first and second generally parallel flowtubes which each extend between an inlet manifold and an outlet manifold and comprise respective first and second centerlines that lie in corresponding parallel first and second planes, at least one force driver for vibrating the first and second flowtubes in a natural mode of vibration and at least one motion sensor for detecting the vibrating motion of the flowtubes, the improvement comprising at least one brace bar which includes:

a first stiffening member having a first opening through which the first flowtube is received and secured;

a second stiffening member having a second opening though which the second flowtube is received and secured; and at least one bridge component which is connected to the first stiffening member proximate the first plane and the second stiffening member proximate the second plane.

2. The Coriolis mass flowmeter of claim 1, wherein each stiffening member is generally rectangular in a plane perpendicular to the first and second centerlines.

3. The Coriolis mass flowmeter of claim 2, wherein each stiffening member is generally symmetrical about its corresponding first or second plane.

4. The Coriolis mass flowmeter of claim 1, wherein each stiffening member is generally cylindrical.

5. The Coriolis mass flowmeter of claim 1, wherein the bridge component comprises first and second spaced-apart, generally parallel edges and the bridge component is connected to the stiffening members proximate the first and second edges.

6. The Coriolis mass flowmeter of claim 5, wherein the bridge component comprises a lip extending generally transversely from the first and second edges and the bridge component is connected to the stiffening members through the lips.